United States Patent [19]

Martin et al.

[11] Patent Number: 4,593,435
[45] Date of Patent: Jun. 10, 1986

[54] APPARATUS AND METHOD FOR THE TRANSVERSE HALVING OF POULTRY CARCASSES

[75] Inventors: Eugene G. Martin, New Holland; Dale M. Risser, Denver, both of Pa.

[73] Assignee: Favorite Manufacturing, Inc., New Holland, Pa.

[21] Appl. No.: 485,311

[22] Filed: Apr. 15, 1983

Related U.S. Application Data

[63] Continuation-in-part of Ser. No. 471,295, Mar. 2, 1983, abandoned.

[51] Int. Cl.⁴ .............................................. A22C 21/00
[52] U.S. Cl. ............................................. 17/52; 17/11
[58] Field of Search ................... 17/11, 12, 52, 45, 63

[56] References Cited

U.S. PATENT DOCUMENTS

| | | | |
|---|---|---|---|
| 3,624,863 | 5/1970 | Gasbarro | 17/11 |
| 3,675,272 | 7/1972 | Schacht | 17/52 |
| 3,781,945 | 1/1974 | Taylor | 17/11 |
| 3,918,125 | 11/1975 | Strandine et al. | 17/45 |
| 4,207,653 | 6/1980 | Gasbarro | 17/11 |
| 4,251,901 | 2/1981 | Thomas et al. | 17/11 X |
| 4,271,561 | 6/1981 | Lewis | 17/11 |
| 4,306,335 | 12/1981 | Hawk et al. | 17/52 |

*Primary Examiner*—Willie G. Abercrombie
*Attorney, Agent, or Firm*—Price, Heneveld, Huizenga & Cooper

[57] ABSTRACT

An apparatus and method for individually receiving continually, from a moving succession of shackle conveyor invertably suspended eviscerated whole poultry carcasses, and thereafter cooperatively guiding each such whole poultry carcass in controlled and cooperatively timed conveyable delivery transport therewith sequentially to an inclined rotating cog wheel having a circumferential radial arrayal of regularly repeating identical teeth so that one such tooth thereof insertably engages respectively the evisceration vent of each whole poultry carcass sequentially transported thereby and in such disposition presents the same to a pre-positioned carcass-transverse severing blade adapted to automatically engage and effect a migratory transverse incision at the base of the carcass keel transversely across the carcass bilateral connecting tissue webs disposed between the breast and thighs while moving along a continuous directed path of travel whereby a progressive completion of the migratory incision into a carcass section transverse pull-torn substantial halving is effected which is completed by a breaking of the back of the carcass section by use of an increasingly inclined conical auger conveyor assembly, all as a pre-processing step to thereafter accomplishing subsequent blade severed carcass transverse halving followed by separate forward and rearward transverse carcass section reduction operations as appropriate at other processing machine locations such as the removal and sectioning of wings, breasts, legs and the like.

36 Claims, 14 Drawing Figures

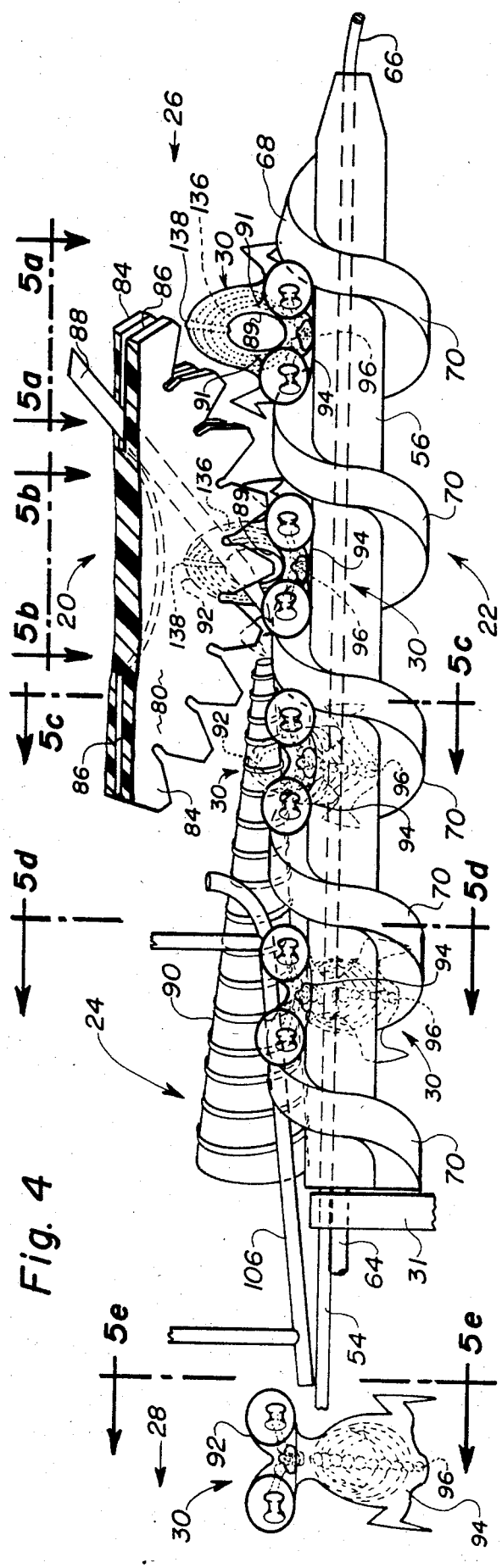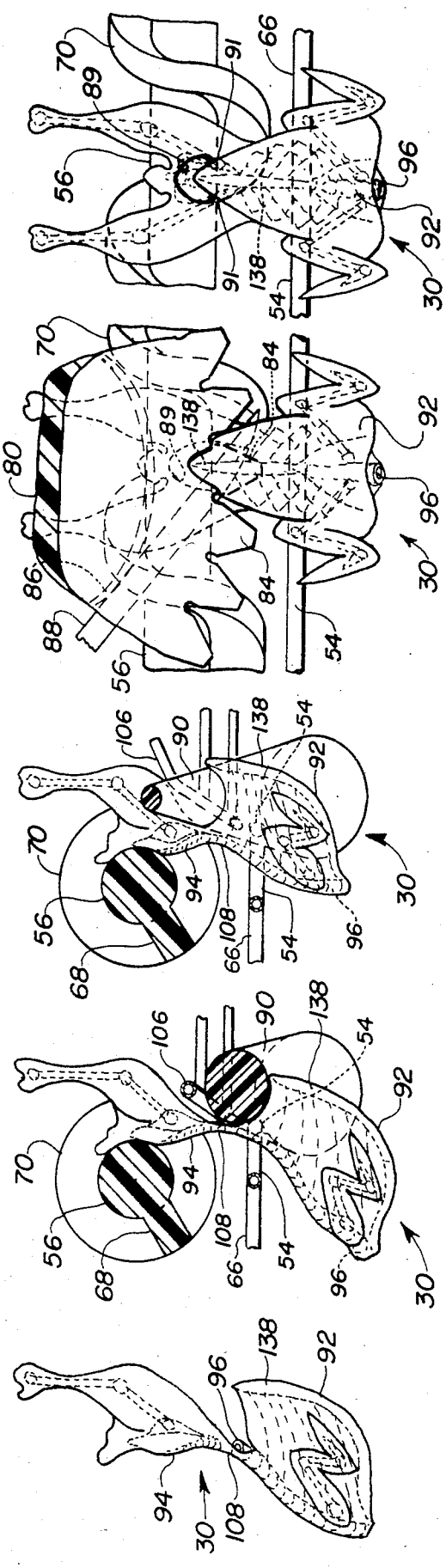

APPARATUS AND METHOD FOR THE TRANSVERSE HALVING OF POULTRY CARCASSES

This application is a continuation-in-part of Ser. No. 471,295, filed Mar. 2, 1983, now abandoned.

BACKGROUND OF THE INVENTION

The present invention relates to a machine and method for effecting whole poultry carcass transverse halving into forward and rearward bilateral carcass sections as a pre-processing operation step to facilitate subsequent processing respectively of the forward and rearward sections by other processing operations at other locations. An example of the pre-processing transverse halving cut method to provide forward and rearward bilateral poultry carcass sections for subsequent separate forward and rearward bilateral carcass section rotary blade cutting reduction into various other cut poultry piece components is as taught in U.S. Pat. No. 3,675,272 to Schacht dated July 11, 1972, and shown in FIG. 4 thereof, wherein a rotating blade means is employed to accomplish the transverse forward and rearward sectioning of a whole poultry carcass as above-described. Another apparatus which utilizes transverse cut poultry carcass sections as the infeed thereto is that dual-line machine as taught by Hawk et al in U.S. Pat. No. 4,306,335 dated Dec. 22, 1981, which is adapted to receive, segregate, and process on one line or the other thereof either forward or rearward bilateral carcass sections and respectively reduce the same into various cut poultry piece components. It is the machine and method of instant invention which provides the pre-processed transverse halved bilateral carcass section infeed material to machines such as that taught by Hawk et al cited supra.

In considering the invention hereof as briefly described above, and as hereinafter more fully detailed, it is to be understood that the term poultry carcass is used in the generic context to mean eviscerated fowl generally, including but not necessarily limited to old and young chickens, small and large turkeys, ducks, geese, and guineas.

The apparatus disclosed by Thomas et al in U.S. Pat. No. 4,251,901 dated Feb. 24, 1981, teaches a carousel machine provided with a sprocket wheel drive take-off from an overhead shackle conveyor drive chain which is somewhat similar to the machine of instant invention, however, the processing method thereof is distinguishable in that the succession of invertably suspended whole poultry carcasses are respectively engaged by one of a plurality of supporting means for cam operated clamping of the carcass and thereafter lateral severing of the breast and splitting of the breast bone by pivotal cam operated blade means.

Other apparatus of pertinent bearing with respect to the structure, function, and method of instant invention would include those Patents respectively of Taylor and Strandine et al, wherein the Taylor teaching as set forth in U.S. Pat. No. 3,781,945 dated Jan. 1, 1974, discloses the combined employment of an overhead shackle conveyor from which a succession of poultry carcasses are invertably suspended for delivery to a co-acting conical screw conveyor for engagement of the necks thereof for positioning and delivery to a subsequent work station for accomplishing crop extraction. The Strandline et al teaching of U.S. Pat. No. 3,918,125 dated Nov. 11, 1975, also discloses the combined employment of an overhead shackle conveyor from which poultry carcasses are invertably suspended for delivery to and engagement by a spaced set of co-acting conical screw conveyors which engage the poultry carcass neck and direct the head to rotating blade engagement means.

It should be understood that some of the features of the instant invention have, in some respects, certain structural and functional similarities to teachings separately set forth in the prior art disclosures heretofor cited and briefly discussed. However, as will hereinafter be pointed out, the instant invention is distinguishable from said earlier inventions in one or more ways in that the present invention has utility features and new and useful advantages, applications, and improvements in the art of apparatus and method for the transverse halving of poultry carcasses not heretofore known.

SUMMARY OF THE INVENTION

It is the principal object of the present invention to provide a machine and method for successive in-transit receiving, positioning, and accomplishing a substantial torso-transverse halving of invertably shackle conveyor suspended poultry carcasses into forward and rearward bilateral sections in the pre-processing preparation thereof for separate processing reduction of the respective forward and rearward bilateral halves by other processing operations at other locations.

Another object of the present invention is to provide a machine which is adapted to either operably engage an in-transit conveyor succession of poultry carcasses, or alternately be disengaged and pass said in-transit conveyor succession of poultry carcasses therethrough without the accomplishment of torso-transverse pre-processing preparation thereof.

Still another object of the present invention is to provide a method and apparatus for initiating the torso-transverse halving of eviscerated whole poultry carcasses by a mechanically cooperative insertable engagement sequentially of the respective evisceration vents of said carcasses with one of an identical plurality of protruding teeth disposed circumferentially about the periphery of an inclined rotating cog wheel whereby the vent inserted tooth engagement stabilizes registered transport of said carcass to a pre-positioned carcass-transverse severing blade adapted to automatically engage and effect a migratory transverse incision at the base of the carcass keel transversely across the carcass bilateral connecting tissue webs toward the backbone.

A further object of the present invention is to provide a method and apparatus for effecting the torso-transverse halving of eviscerated whole poultry carcasses by first severing the carcass transversely behind the keel toward the backbone and thereafter reflexively bending the carcass section rearward about the mid-back location so as to effect a separable breaking of the carcass section backbone.

Yet another object of the present invention is to provide a method for accomplishing torso-transverse halving of invertably shackle conveyor suspended poultry carcasses without causing bone fragment contamination of either the respective forward or rearward bilateral sections.

It is also an object of the present invention to accomplish in-transit torso-transverse halving of invertably shackle conveyor suspended poultry carcasses into forward and rearward bilateral sections without additional handling thereof.

Details of the foregoing objects and of the invention, as well as other objects thereof, are set forth in the following specification and illustrated in the accompanying drawings comprising a part thereof.

BRIEF DESCRIPTION OF THE DRAWINGS

FIG. 4 is an enlarged top plan view of the machine section shown in FIG. 1 as seen along the line 4—4 thereof, and further illustrating a progression of exemplary eviscerated poultry carcass members to more clearly portray the sequential method provided by said machine in accomplishing transverse halving thereof.

FIG. 5a is a fragmentary horizontal view of the machine section and exemplary poultry carcass configuration shown in FIG. 4 as seen along the line 5a—5a thereof.

FIG. 5b is a fragmentary horizontal view of the machine section and exemplary poultry carcass configuration shown in FIG. 4 as seen along the line 5b—5b thereof.

FIG. 5c is an end elevation view of the machine section and exemplary poultry carcass configuration shown in FIG. 4 as seen along the line 5c—5c thereof.

FIG. 5d is an end elevation view of the machine section and exemplary poultry carcass configuration shown in FIG. 4 as seen along the line 5d—5d thereof.

FIG. 5e is an end elevation view of the machine section and exemplary poultry carcass configuration shown in FIG. 4 as seen along the line 5e—5e thereof.

DETAILED DESCRIPTION OF THE INVENTION

Figure 1:
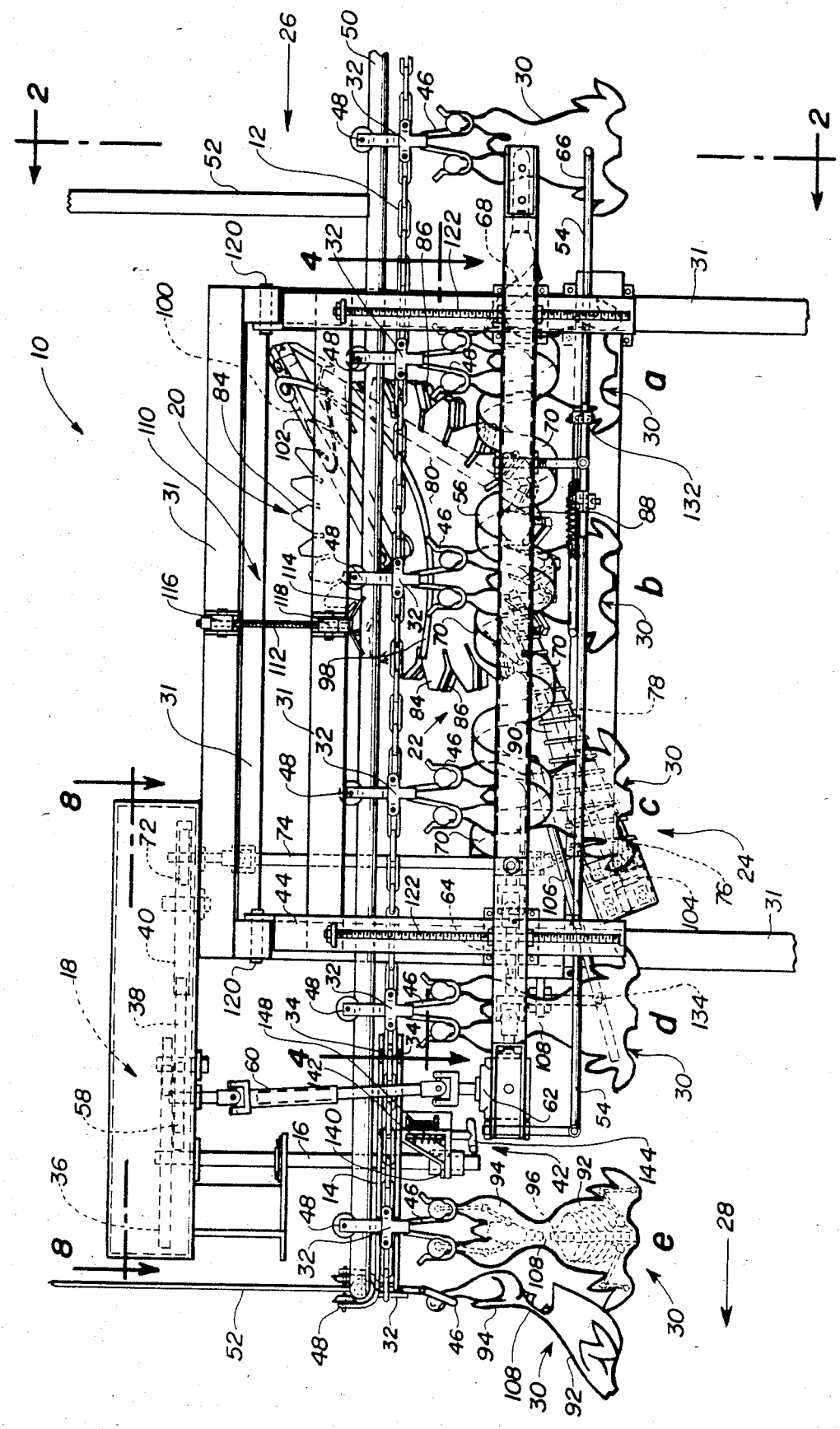
FIG. 1 is a front side elevation of the machine of instant invention for accomplishing the transverse halving of poultry carcasses, the same being shown in a typical operational configuration with exemplary poultry carcasses to also illutrate the method of employment and operation of said machine.

Referring to FIG. 1, the present invention and method of employment thereof is shown, wherein the mechanical component thereof comprises a poultry carcass transverse halving machine 10 powered by an in-line moving shackle conveyor chain 12 operating through a shackle conveyor/machine power take-off wheel 14 which transmits mechanically timed rotary motion through the main drive shaft 16 to the shackle conveyor/machine power take-off drive train 18 which in turn transmits rotary drive power to the remainder of said machine 10 operational sub-assemblies being the rotating cog assembly 20 which coactively operates with the flited carcass leg space and drive conveyor assembly 22 and the increasingly inclined conical auger conveyor assembly 24 to cooperatively accomplish automatically the pre-processing operation of poultry carcass transverse halving without further poultry carcass handling per se during in-line shackle conveyor successive transport transit thereof from the in-feed end 26 to the delivery end 28 of said machine 10.

Referring again to FIG. 1 to describe in greater detail the component parts of this invention as well as explain the operation thereof, wherein are also shown exemplary poultry carcasses 30 in successive concurrent shackle conveyor transport through said machine 10 at various transverse halving operation sequence stages from the infeed end 26 to delivery end 28 of said machine 10.

Figure 2:
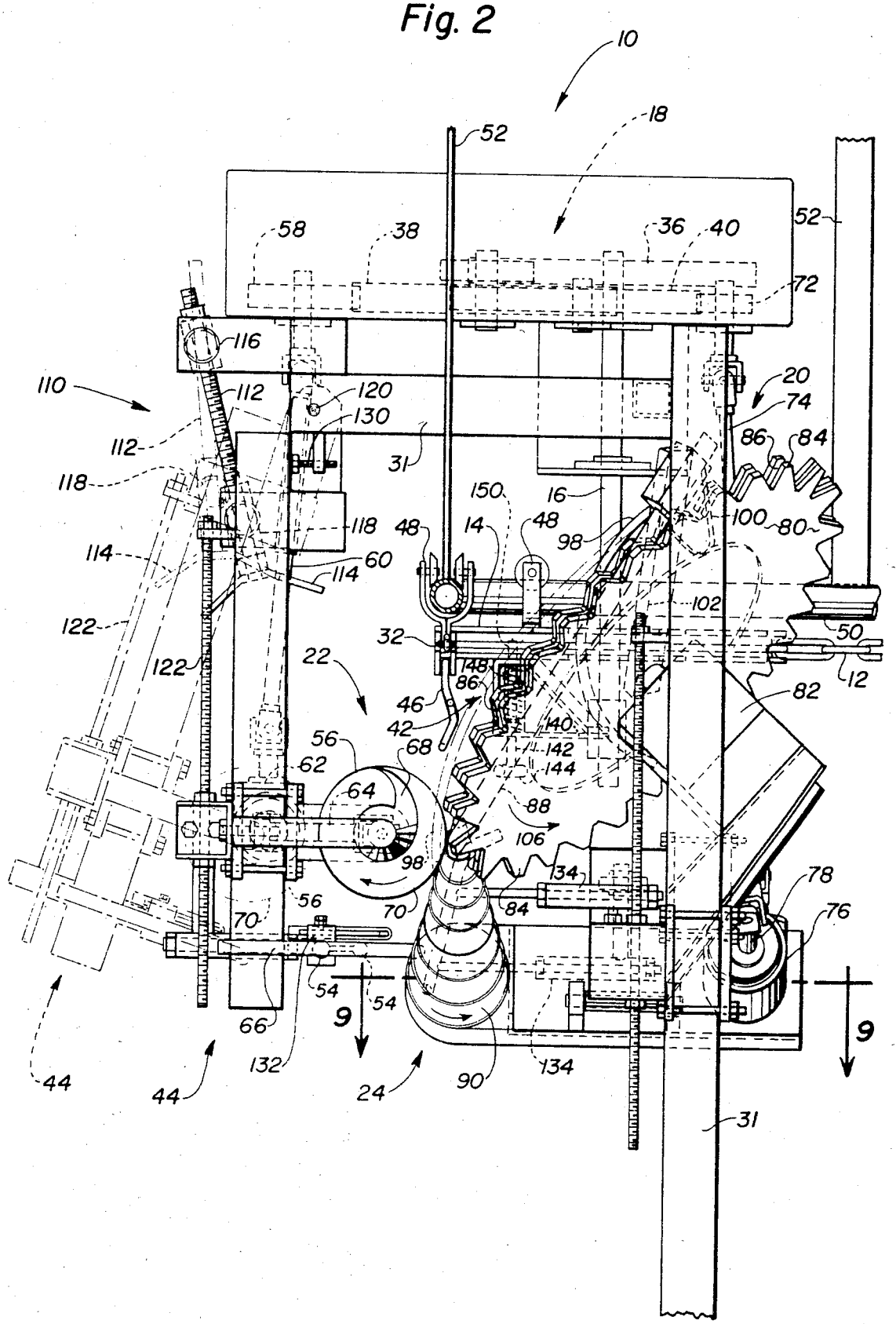
FIG. 2 is an enlarged end elevation of the machine shown in FIG. 1 as seen along the line 2—2 thereof.

In use application, said machine 10 is placed in-line along the shackle conveyor course between the eviscerating and subsequent processing station locations as conditions and space limitations would permit in a typical modern poultry processing plant operation, and is erected in such placement location by means of interconnected vertical and horizontal support members 31. The machine 10 operational stations, as previously noted, are driven in mechanically timed rotary motion with the moving shackle conveyor chain 12 which is accomplished by effecting shackle suspension conveyor chain connection lug 32 engagement with radially spaced slot openings 34 provided within the periphery of said shackle conveyor/machine power take-off wheel 14 at arcuate center-to-center displacement distances corresponding to the center-to-center lineal interval distances between said shackle suspension conveyor chain connection lugs 32, which drive means is shown in greater detail in FIG. 6 to be hereinafter more fully discussed. Machine 10 rotary drive power is directly communicated from the shackle conveyor/machine power take-off wheel 14 through the main drive shaft 16 to the machine power take-off drive train main drive wheel 36 and from there transmitted through a first to a second drive train power distribution idler wheel means 38 and 40 respectively in re-communication of cooperation mechanically timed rotary drive motion and power to operational sub-assembly drive shaft wheels. It should be noted at this point that in the event poultry carcasses and the processing operations thereon subsequent to evisceration do not require carcasses that have been pre-processed to transverse half configurations, then the shackle conveyor/machine power take-off drive engagement assembly 42 is disengaged thereby disconnecting rotary motion and power transmission from the shackle conveyor/machine power take-off wheel 14 to the main drive shaft 16, and concurrent therewith the flited carcass leg space and drive conveyor support assembly 44 is pivotally adjusted to an alternate inoperative position as shown in FIG. 2, all as will be hereinafter more fully described, and the succession of exemplary poultry carcasses 30 invertably suspended from shackles 46 are thereupon transported through said machine 10 by the moving shackle conveyor chain 12 without the performance of transverse halving pre-processing operations thereupon.

Presuming in the first instance for purposes of continued discussion, however, it is desired to employ said machine 10 and the method thereof in automatically accomplishing transverse halving of poultry carcasses as a pre-processing operation prior to the performance of subsequent processing operations thereon. As shown in FIG. 1, a succession of exemplary poultry carcasses 30 invertably suspended from shackles 46 connected by shackle suspension conveyor chain connection lugs 32 at regularly repeating center-to-center positions upon the moving shackle conveyor chain 12 are transported thereby and delivered to the machine infeed end 26 as shown. It will also be noted, as shown, the exemplary poultry carcasses 30 are delivered to the machine 10 with the backs thereof facing outward from the rotating cog assembly 20, and at a uniform elevation maintained thereat by means of wheeled shackle bracket 48 supportable retention upon the wheeled shackle bracket guide tube 50 in turn suspended at a uniform elevation by means of guide tube support members 52 therefor.

As the typical exemplary poultry carcass 30 enters the machine 10 infeed end 26 in a configuration as shown and above described, machine lateral orientation and positioning of the carcass with respect to operational sub-assembly processing stations is provided and maintained by the longitudinal guide rod 54 which extends generally from the machine 10 infeed end 26 to the delivery end 28 and underlies and is set to be generally parallel to the axis of rotation of the flited carcass leg space and drive conveyor 56, and in combination with the wheeled shackle bracket guide tube 50 as previously described above fixes the spatial disposition of each poultry carcass 30 with respect to the machine 10 operational sub-assembly processing stations from infeed through delivery ends thereof.

Initial machine 10 operational sub-assembly processing station engagement per se, of an exemplary poultry carcass 30 is by the flited carcass leg space and drive conveyor assembly 22, and particularly by the flited carcass leg space and drive conveyor 56 thereof which is powered off the first drive train power distribution idler wheel means 38 by intermeshing engagement thereof with the flited conveyor drive wheel 58 in turn transmitting shackle conveyor timed rotary motion through the flited conveyor power take-off drive shaft 60 connected thereto into the flited conveyor right angle gear box 62 and retransmitting therefrom through the flited conveyor coupling drive shaft 64 to the flited carcass leg space and drive conveyor 56. It will be noted that at position "a" as shown in FIG. 1, the exemplary poultry carcass 30, advanced from the machine infeed end 26 location at a uniform elevation as maintained by means of the wheeled shackle bracket guide tube 50 as previously described, is by slidable contact along the upper inverted bilateral exterior back surface thereof by the inwardly directing curved segment 66 infeed end of the longitudinal guide rod 54 which establishes the machine 10 operational sub-assembly processing station lateral positioning of each successive poultry carcass 30 infed thereto. As a poultry carcass 30 is progressively advanced further machine 10 inward by means of the moving shackle conveyor chain 12, but prior to being transitorily disposed longitudinally at position "a", the infeed flite 68 of said flited carcass leg space and drive conveyor 56 rotatably engages the forward moving poultry carcass 30 along the lower inverted bilateral exterior upper tail surface thereof and slidably registers the progression of rotating transport flites 70 of said conveyor 56 in that space between the shackled leg members of said carcasses 30 to first accomplish coactive machine 10 longitudinal transport of the inverted upper extremity portion thereof of each successive carcass 30 in timed displacement with said moving shackle conveyor chain 12 and concurrently function as a back-up registration and work surface for the performance of subsequent machine 10 operational sub-assembly processing functions upon said carcasses. By the time of transport displacement to position "a" the poultry carcass 30 machine 10 disposition just above-described has been achieved.

Figure 3:
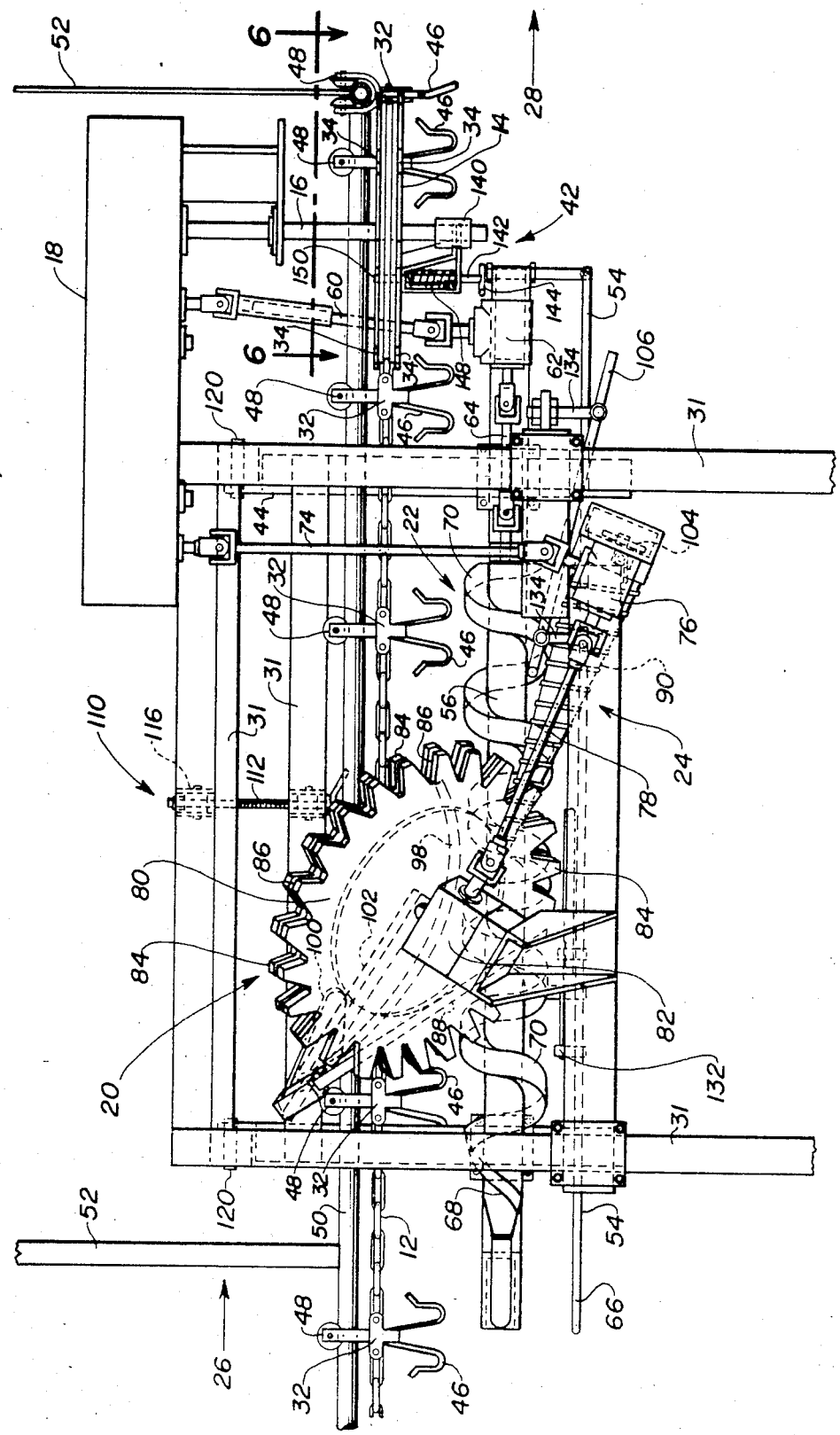
FIG. 3 is a back side elevation of the machine of instant invention corresponding to that view as previously illustrated in FIG. 1, but, however, without the inclusion of exemplary poultry carcasses so as to show certain additional mechanical detail thereof.

At position "a" the poultry carcass 30 is staged for continued co-active moving shackle conveyor chain 12 and flited carcass leg space and drive conveyor 56 transport advancement and infeed to the rotating cog assembly 20, which is driven by second drive train power distribution idler wheel means 40 intermeshed engagement with the rotating cog assembly drive wheel 72 which in turn transmitts mechanically timed rotational power and motion to the rotating cog assembly power take-off drive shaft 74 thereafter transmitting through the dual right angle gear box 76 and thence through the rotating cog assembly coupling drive shaft power take-off 78 in intercoupled drive of the rotating cog wheel 80 through the rotating cog wheel right angle gear box 82 and drive shaft, the latter of which for purposes of clarity is not shown in FIG. 1 but, however, is illustrated as appropriate in both FIGS. 2 and 3.

It will be noted that the rotating cog wheel 80 has a periphery provided with a circumferential radial arrayal of regularly repeating identical teeth 84 in turn provided with an intermediate transverse blade slot 86 thereby allowing for mechanically co-operative incorporation of the carcass having incision blade 88 so that as the poultry carcass 30 is advanced thereto as above-described a tooth 84 insertably enters the carcass section eviscerating vent 89 thereby stabilizing the carcass and tensioning the breast-to-thigh transverse carcass bilateral connecting tissue webs 91 between the keel and thighs of said carcass and immediately thereafter upon continued arcuate displacement of said rotating cog wheel 80 and timed co-active transport of said carcass 30 the incision blade 88 cooperatively with said tooth 84 of the rotating cog wheel 80 first effects severing of the forward leading and then rearward trailing breast-to-thigh transverse carcass bilateral connecting tissue webs 91 of the carcass 30 transversely just below the tip of the breast keel thereof and concurrently therewith said tooth 84 of the rotating cog wheel 80 arcuately operates to transitionally downward engage the transverse opening made by the incision blade 88 and further initiate a transverse migrational separation of the carcass 30 as occurs in FIG. 4 proximity the section line 5b—5b thereof, hereinafter described in greater detail, preparatory to progressive longitudinal engagement of the enlarged transverse opening by the conical auger 90 of the increasingly inclined conical auger conveyor assembly 24 to effect both carcass 30 transverse separation into forward 92 and rearward 94 bilateral halves and then a breaking of the carcass section backbone 96.

Additional mechanical features of the rotating cog assembly shown in FIG. 1 include a spring loaded deflectable blade guard 98 and a finger guard 100 both positionally assembled upon the rotating cog assembly guard support member 102.

As the transversely bisected poultry carcass 30 transitorily passes from the rotating cog assembly 20 to the increasingly inclined conical auger conveyor assembly 24, as shown at position "b", the conical auger 90 engages the transverse incised opening prepatory to continuance and completion of the carcass 30 transverse halving pre-processing operation generally as follows.

The conical auger 90, rotationally driven by sprocket and chain 104 off the dual right angle gear box 76 as shown, counter-rotates to the flited carcass leg space and drive conveyor 56 which as previously recited provides a continual moving back-up support surface for progressive accomplishment of pre-processing halving operations upon the carcass 30 and during transitory advancement thereof from position "b" to position "c" said conical auger 90 counter-rotationally engages the previously carcass transverse incised opening progressively enlarging the same by migratory pull-tearing of any remaining breast-to-thigh transverse carcass bilateral connecting tissue web 91 while at the same time urging the forward bilateral half of said carcass downward and in slidably engaged cooperative continued guidance by the pinch rod 106 reflexively at the carcass mid-back location to thereby effect bending thereof about the longitudinal guide rod 54 resulting in separable breaking of the carcass section backbone 96 as shown at position "e" with a ribbon of back skin tissue 108 which holds the otherwise separated forward 92 and rearward 94 bilateral halves of said carcass 30 together for facilitated moving shackle conveyor chain 12 continued transport to other carcass section processing operation reduction locations as aforesaid.

Other mechanical features of machine 10 shown in FIG. 1 include the pivotal disengagement means for the flited carcass leg space and drive conveyor support assembly 44 whereby said support assembly 44 may be pivotally adjusted to an alternate inoperative position which pivotal disengagement means includes as component parts thereof the support assembly turnbuckle adjustment and set means 110 comprised of a threaded rod 112 adjustably operable by handle means 114 through an upper and lower pivot block 116 and 118 respectively to pivotally deflect and set the position of said support assembly about the support assembly pivot pintles 120. Also shown in FIG. 1 are the threaded flited carcass leg space and drive conveyor vertical adjustment rods 122 whereby said flited carcass leg space and drive conveyor 56 may be adjusted to accommodate setting for the process running of either larger or smaller size and weight poultry carcass batches.

Preferably, the machine 10 structure as illustrated and described in consideration of FIG. 1 is constructed of corrosive resistant metal alloys and plastics respectively such as stainless steel and the trade-name product known as Teflon, but any other suitable materials or combinations thereof may be used.

Referring now to FIG. 2 to explain additional structural detail features of said machine 10, as well as also describe with greater particularity the make-ready setting thereof for the process running of a particular poultry carcass batch comprised of a number of poultry carcasses 30 of the same type, size, and weight classification. The moving shackle conveyor chain 12 and the shackles 46 conveyed thereby, the rotating cog assembly 20, and the conical auger 90 are all constant set components and are not per se adjusted or for that matter adjustable except for either a uniform increase or decrease in run speed. Depending, however, upon the particular average size and weight of the poultry carcasses to be run, the flited carcass leg space and drive conveyor 56 is either elevated or depressed by means of the threaded flited carcass leg space and drive conveyor vertical adjustment rods 122 and may be further adjusted pivotally outward or inward by means of the support assembly turnbuckle adjustment and set means 110 in combination with the support assembly angular adjustment deflection set and stop 130, all of which singularly or in combination accommodates the moving back-up work support surface provided by said flited carcass leg space and drive conveyor 56 to the rotating cog wheel 80 and teeth 84 thereof with incision blade 88 and the conical auger 90 as appropriate for progressive accommodation and accomplishment of pre-processing halving operations upon sequentially infed individual carcasses 30 of the particular batch to be run. Thereafter, the longitudinal guide rod 54 is adjusted laterally by means of the longitudinal guide rod lateral adjustment bracket 132 so as to accommodate proper carcass 30 infeed, longitudinal guidance, and reflexive mid-back bending. Lastly, the pinch rod 106 is both laterally and angularly adjusted by means of the pinch rod adjustment brackets 134 with respect to both the conical auger 90 to accomplish carcass guidance for pull-tear migration of the transverse incision with respect to the carcass breast-to-thigh transverse bilateral connecting tissue web 91 as well as co-operatively effect breakage and separation of the carcass section backbone 96 in combination with the conical auger 90 and longitudinal guide rod 54 as respectively set.

Also shown in FIG. 2, in phantom, is the angularly deflected disengaged flited carcass leg space and drive conveyor support assembly 44 disposition as the same would appear when said machine 10 is set to by-pass carcass 30 without pre-processing transverse halving thereof, which is the secondary or alternate machine 10 operational configuration.

The view shown in FIG. 3 is a back side elevation of the machine 10 assembly as previously illustrated in front side elevation in FIG. 1 and enlarged end elevation in FIG. 2, herein, however, detailing additional sub-assembly spatial relationships and cooperative mechanical positioning one with respect to the other in accomplishing poultry carcass transverse halving operations as heretofore described.

Considering next the FIG. 4 and FIG. 5a through FIG. 5e series of illustrations concurrently to detail a step-wise discussion of the method provided through employment of said machine 10 in accomplishing poultry carcass 30 transverse halving. As shown, the respective Figure series detail progression of a typical poultry carcass 30 into and through the machine 10 operational section and in general correspond to the previous position discussion with respect to the passage of a typical poultry carcass 30 as detailed on consideration of FIG. 1, and starts at the position "a" configuration where the poultry carcass 30 as seen in top plan view in FIG. 4 and corresponding side view in FIG. 5a has been in-fed to and engaged by the flited carcass leg space and drive conveyor 56, where it is to be understood, although not specifically shown in either FIG. 4 or the FIGS. 5a–e series for purposes of increased clarity of illustration, the leg hocks of said carcasses 30 are retained in spaced co-active conveyable suspension from shackles 46 of the moving shackle conveyor chain 12 as previously detailed as the transverse carcass halving into joined forward 92 and rearward 94 bilateral parts is taking place by the method hereof on passage of a poultry carcass 30 through said machine 10.

As shown in FIG. 5a, corresponding to the section 5a—5a of FIG. 4, the poultry carcass 30 is positioned for insertable engagement of the evisceration vent 89 thereof by a tooth 84 of the rotating cog wheel 80 thereby stabilizing said carcass and tensioning the breast-to-thigh transverse carcass bilateral connecting tissue webs 91 for transverse incisable intercept by the blade 88 across the belly 136 at a point just below the carcass keel 138, all of which is as shown in FIG. 5b, corresponding to the section 5b—5b of FIG. 4.

In transitional transfer from one longitudinally disposed position from "a" through "d" it will be noted that both the flited carcass leg space and drive conveyor 56 and the longitudinal guide rod 54 co-operatively function to provide a work support surface against which said carcass 30 is impressed during accomplishment of the transverse halving pre-processing operations, the importance of which back-up work surface feature becomes more important and apparent as said carcass 30 transfers from engagement by the rotating cog assembly 20 to the increasingly inclined conical auger conveyor assembly 24 for the completion of transverse halving processing operations, which transfer is effected in carcass 30 forwarded displacement from position "b" to position "c".

As shown in FIG. 5c, corresponding to the section 5c—5c of FIG. 4, the transverse poultry carcass incised opening is insertably engaged by the counter-rotating conical auger 90 whereupon the migratory pull-tear of belly flank tissue, that is, webs 91, in further transverse separation of the forward 92 and rearward 94 bilateral halves of said poultry carcass 30 is accomplished both prior and preparatory to a breaking of the backbone 96. It should also be noted that at position "c" there is initial lead-in contact by the pinch rod 106 which is essential to guided positioning of the carcass 30 in accomplishing backbone 96 breakage by the method hereof.

Completion of the transverse carcass 30 halving pre-processing operation is as shown in FIG. 5d corresponding to the section 5d—5d of FIG. 4, and the machine 10 processed and delivered product is shown in FIG. 5e corresponding to the section 5e—5e of FIG. 4, wherein it will be noted that the conical auger 90 reflexively urges the forward bilateral half 92 of said carcass 30 outwardly and under the longitudinal guide rod 54 to thereby effect a breaking and separation of the backbone 96 but with there remaining a ribbon of back skin tissue 108 whereby continued conveyance of the transverse separably joined forward 92 and rearward 94 bilateral halves of said carcass 30 to subsequent processing locations is facilitated.

Figure 6:
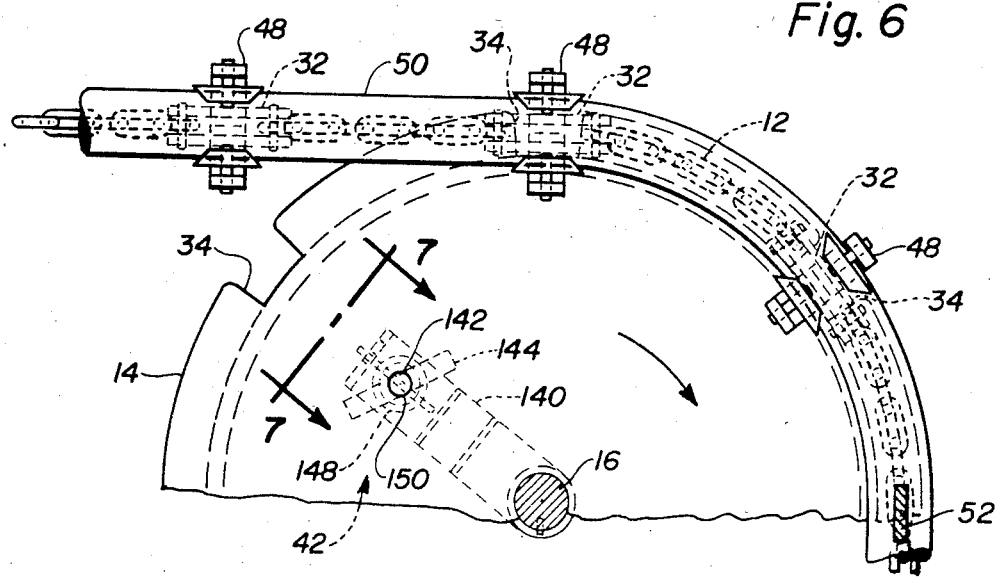
FIG. 6 is a partial enlarged top plan view of the shackle conveyor/machine power take-off shown in FIG. 3 as seen along the line 6—6 thereof.
Figure 7:
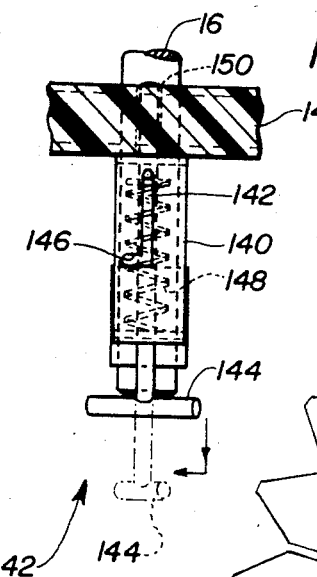
FIg. 7 is an end elevation view of the shackle conveyor/machine power take-off drive engagement shown in FIG. 6 as seen along the line 7—7 thereof.

Considering now FIG. 6, which is a partial top plan view of the shackle conveyor/machine power take-off wheel 14, and in particular showing the relationship thereto of the shackle conveyor/machine power take-off drive engagement assembly 42 which in turn is shown in enlarged side sectional elevation in FIG. 7. As shown, the engagement assembly 42 communicates with the main drive shaft 16 by means of mounting bracket 140 and couples or disconnects with the shackle conveyor/machine power take-off wheel 14 by means of the spring-loaded shackle conveyor/machine power take-off drive train engagement pin 142 operable for coupling or disconnect with respect to said wheel 14 by means of operating handle 144 cooperatively with pin lug 146 against compression spring 148 to engage or disengage for machine 10 drive by either insertion or retraction of said pin 142 into or from wheel engagement socket 150.

Figure 8:
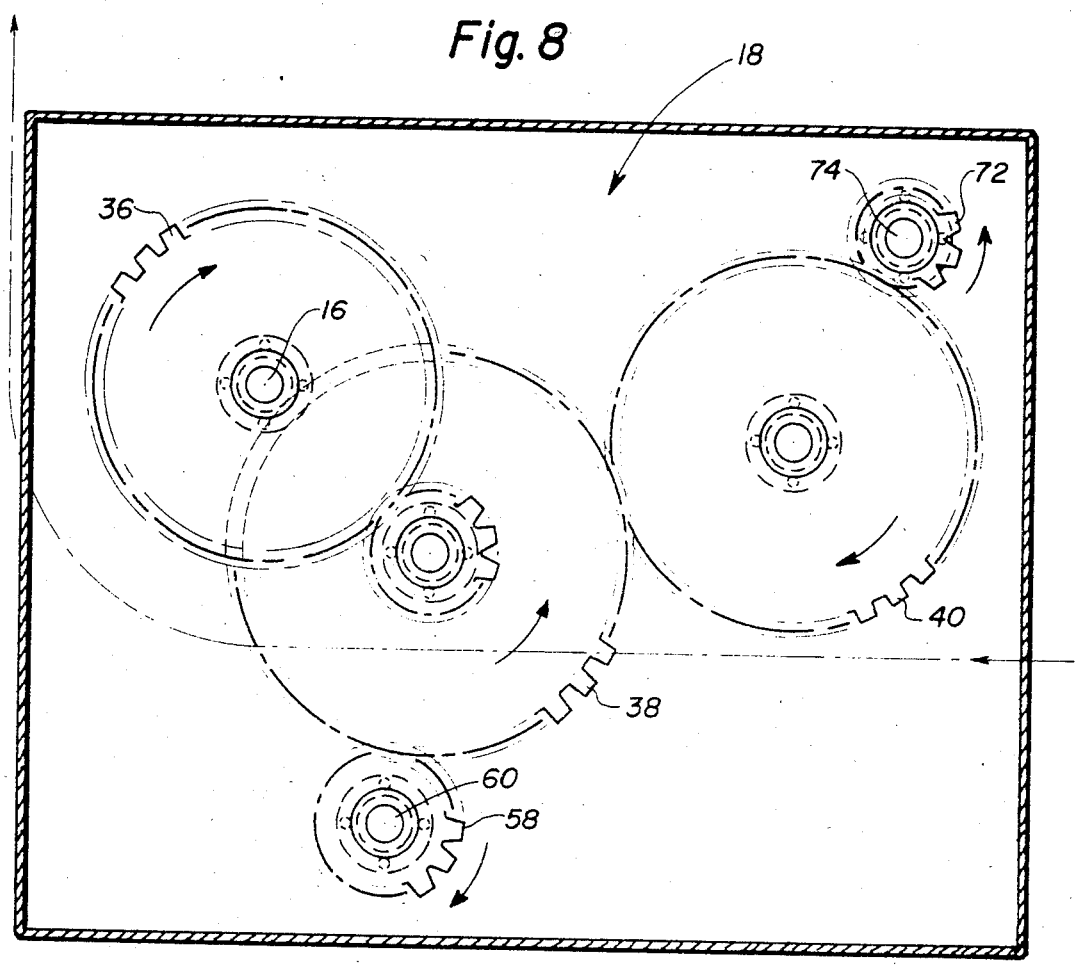
FIG. 8 is an enlarged top plan view of the shackle conveyor/machine power take-off drive train shown in FIG. 1 as seen along the line 8—8 thereof.

In FIG. 8 an enlarged top plan view of the drive train 18 is shown, wherein the phantom line with arrows indicates both the trace and direction of travel of the moving shackle conveyor chain, and the wheel arrows designate the direction of respective rotations thereof in timed transmission of drive power to the machine 10 operational sub-assembly stations.

Figure 9:
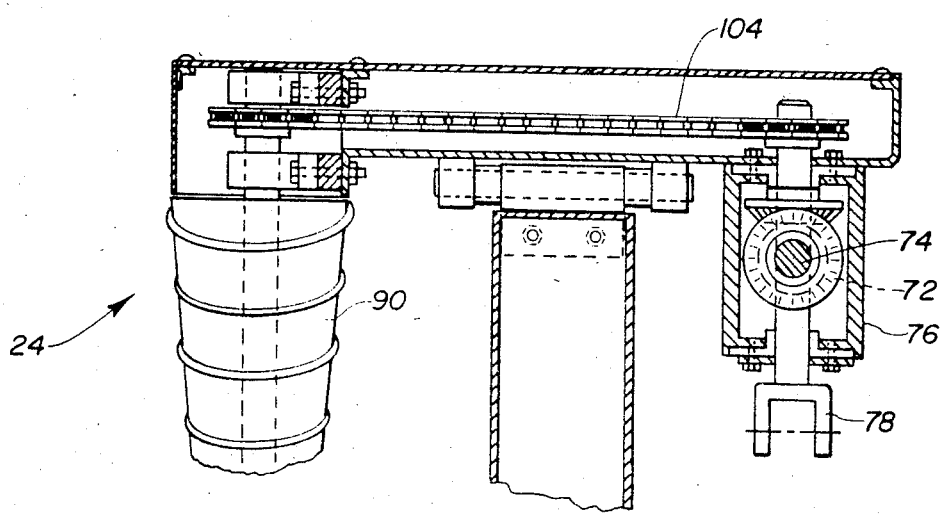
FIG. 9 is an enlarged top plan view of the increasingly inclined conical auger conveyor assembly drive train shown in FIG. 2 as seen along the line 9—9 thereof.

The enlarged top plan sectional view shown in FIG. 9 more particularly details the power take-off from the dual right angle gear box 76 through sprocket and chain 104 to impart rotary drive motion to the conical auger 90.

Figure 10:
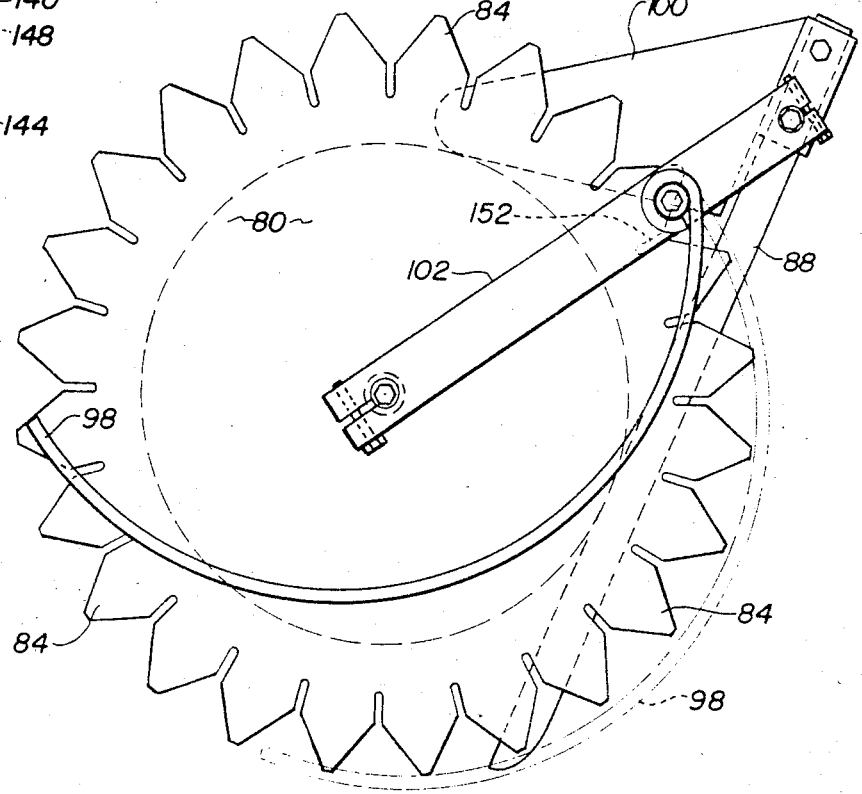
FIG. 10 is an enlarged top plan view of the rotating cog assembly generally as seen in FIGS. 1, 2, and 3, showing greater detail of the blade and finger guard means provided therefor.

Lastly, the enlarged top plan view shown in FIG. 10 more specifically details the cooperative assemblage structure of the rotating cog assembly 20 as previously discussed, and additionally shows the loop spring 152 whereby the deflectable blade guard 98 is caused to operate.

Although the invention has been herein shown and described in what is conceived to be the most practical and preferred embodiment, it is recognized that departures may be made therefrom within the scope of said invention, which is not to be limited to the details disclosed herein but is to be accorded the full scope of the claims so as to embrace any and all equivalent devices, apparatus, and methods.

We claim:

1. A machine operable automatically to sequentially effect individual transverse halving of a whole eviscerated poultry carcass respectively from a shackle conveyor invertably suspended succession thereof infed thereto, said machine comprising in combination:
   a. a longitudinally disposed support frame having interconnected horizontal and vertical members,
   b. an infeed end and a delivery end respectively positioned at the opposite longitudinally disposed ends of said machine,
   c. a power take-off wheel having peripheral means adapted to rotatably engage a moving shackle conveyor chain of said shackle conveyor and transmit the longitudinally displaced motion thereof rotatably to a main drive shaft of said machine,
   d. a longitudinally disposed guide rod means extending parallelly to the longitudinally disposed support frame of said machine from the infeed end to the delivery end thereof,
   e. a rotating flited carcass leg space and drive conveyor adapted to receive individually poultry carcasses from said invertably suspended succession and cooperatively displace the same respectively from the infeed end to the delivery end of said machine in timed longitudinal transport with said moving shackle conveyor chain,
   f. a rotating cog wheel assembly provided with a blade means adapted to transversely sever an opening in each of said poultry carcasses respectively below the tip of the keel across the belly thereof during cooperative moving shackle conveyor chain and flited carcass leg space and drive conveyor longitudinally displaced transport thereby, and
   g. a rotating inclined conical auger conveyor means provided with an auxiliary guide means cooperatively adapted to effect insertable engagement of said poultry carcass transverse severed opening and thereupon progressively effect a pull-tear transverse migration enlargement of said opening across the poultry carcass belly flank tissue followed by progressive conically forced reflexive bending of the back of said poultry carcass outwardly about said longitudinal guide rod to separably effect a backbone breaking thereof and thereafter by continued means of said moving shackle conveyor chain conveyably deliver said carcass to supplemental processing operations at other locations.

2. The machine according to claim 1 in which said power takeoff wheel peripheral means is a plurality of regularly repeating radially spaced slot openings respectively adapted to engageably receive therein a wheeled shackle bracket of a linear succession thereof assembled to said shackle conveyor.

3. The machine according to claim 2 in which a center-to-center displacement distance between said slot openings corresponds to a center-to-center wheeled shackle bracket displacement distance between the linear succession thereof assembled to said shackle conveyor.

4. The machine according to claim 1 in which said guide rod means is provided with an inwardly directing curved segment at the infeed end thereof.

5. The machine according to claim 4 in which said guide rod means is provided with a lateral displacement adjustment and set assembly.

6. The machine according to claim 4 in which said guide rod means is provided with a vertical displacement adjustment and set assembly.

7. The machine according to claim 1 in which the moving shackle conveyor chain and rotating flited carcass leg space and drive conveyor cooperative poultry carcass timed longitudinal transport is in regularly repeating longitudinally spaced relationship.

8. The machine according to claim 1 in which a rotating cog wheel of said rotating cog wheel assembly counter-rotates to the rotational direction of said rotating flited carcass leg space and drive conveyor.

9. The machine according to claim 1 in which a conical auger of said rotating inclined conical auger conveyor means counter-rotates to the rotational direction of said rotating flited carcass leg space and drive conveyor.

10. The machine according to claim 1 in which said auxiliary guide means is an inclined pinch rod cooperatively adjustable spatially with respect to said conical auger.

11. The machine according to claim 1 in which said power takeoff wheel is provided with a drive engagement assembly adapted to selectively enable power transmission engagement or disengagement thereof with said main drive shaft.

12. The machine according to claim 1 in which said longitudinally disposed support frame is provided with a pivotally adjustable flited carcass leg space and drive conveyor support assembly.

13. A machine for cutting whole eviscerated poultry carcasses between the keel and the thighs toward the backbone thereof as said poultry carcasses are sequentially moved along a predetermined path by an overhead conveyor suspended in an inverted attitude, said machine comprising a wheel member rotatably supported on an axis approximately normal to the path of the carcasses, said wheel member including a series of teeth at circumferentially spaced intervals thereabout with the teeth sized and shaped to insertably engage the evisceration vents of poultry carcasses moving along said predetermined path, and a stationary incision blade positioned in said predetermined path of said carcasses in juxtaposition with said wheel member at the teeth of said wheel member whereby the teeth carry the poultry carcasses to the incision blade and the incision blade cuts through said poultry carcasses.

14. The machine according to claim 13 wherein slots are formed in the teeth of said wheel member with said slots being circumferentially aligned about said wheel member and said slots are arranged to move about said incision blade.

15. The machine according to claim 13 wherein said incision blade is supported adjacent the axis of said wheel member and projects from adjacent the axis radially outwardly to the vicinity of the teeth.

16. The machine according to claim 13 wherein said wheel member defines a slot extending circumferentially thereabout through the teeth of the wheel member, and wherein said incision blade is supported in a stationary position in said slot so that the teeth move about said blade during rotation of said wheel member.

17. The machine according to claim 13 further including a conveyor means positioned adjacent the path of the poultry carcasses for urging the lower portion of each carcass that has been partially separated from the upper portion of the carcass along a diverging path so as to bend the lower portion of each carcass with respect to the upper portion thereof and break the backbones of the carcasses.

18. A machine for cutting poultry carcasses and the like as the carcasses are moved along a path in series on an overhead conveyor and suspended in an inverted attitude comprising a guide member rotatable about an axis extending at an angle with respect to the path, said guide member comprising about its periphery a series of equally spaced teeth and recesses, means for rotating said guide member so that its teeth and recesses intersect the path and the teeth extend on opposite sides of a portion of a carcass so that a recess between the teeth receives a portion of the carcass as the portion of the carcass moves along the path, and a stationary incision blade positioned along the path at the position where the teeth and recesses intersect the path, whereby the teeth and recesses carry a portion of a carcass to the incision blade and the incision blade cuts through the portion of the carcass.

19. The machine according to claim 18 wherein said guide member comprises a wheel member with a slot extending circumferentially thereabout and extending radially inwardly from the peripheral portion through the teeth whereby the teeth are bifurcated, and wherein said incision blade is positioned in said slot and the teeth pass about the incision blade.

20. A method for effecting transverse bilateral halving of a poultry carcass, said method comprising conveyably transporting a succession of invertably suspended whole eviscerated poultry carcasses along a guided path, severing an opening in each poultry carcass of said succession automatically with a blade means transversely across the belly respectively below the keel tip thereof during continued conveyable transport along said guided path, automatically engaging said opening transitorily with an inclined rotating cone means in effecting a progressive pull-tear migratory enlargement of said opening transversely across the belly flank tissue of said carcass and thereupon progressively forcing a transitory inverting reflexive bending of said carcass outwardly about the mid-central back portion thereof to separably effect a backbone breaking and thereby disjoint said whole carcass into a forward bilateral half transversely connected dependently by a joining ribbon of back skin tissue to a rearward bilateral half thereof.

21. A method of cutting whole eviscerated poultry carcasses comprising moving a plurality of poultry carcasses in series each suspended in an inverted attitude along an overhead conveyor, engaging the back of each carcass with a conveyor moving in timed relationship with the carcass, projecting a rotating tooth into the evisceration vent of each carcass and moving the rotating tooth in timed relationship with the conveyor to stabilize and position the carcass, and moving the carcass with the conveyor and the rotating tooth past a substantially stationary blade that projects into the path of the carcass so that the blade cuts the carcass between the keel and the thighs toward the backbone of said carcass.

22. The method according to claim 21 further including the step of progressively bending the cut-apart portions of the carcass with respect to each other to break the backbone of the carcass.

23. The method according to claim 21 wherein the step of projecting a rotating tooth into the evisceration vent of the carcass comprises projecting a bifurcated rotating tooth into the evisceration vent of the carcass, wherein the step of moving the carcass with the conveyor and the rotating tooth past a substantially stationary blade comprises moving the rotating tooth about the blade with the bifurcated portions of the rotating tooth passing on opposite sides of the blade.

24. The method according to claim 21 wherein the step of engaging the back of each carcass with a conveyor comprises engaging the carcass with a flited conveyor with the flites thereof positioned substantially in front of and behind each carcass to stabilize the carcass as the carcass is cut.

25. The method according to claim 21 wherein the step of projecting a rotating tooth into the evisceration vent of each carcass comprises rotating a wheel member adjacent the path of the carcasses with rotating teeth extending from the wheel member moving into the evisceration vents of each carcass.

26. The method according to claim 25 wherein the step of moving the carcasses with the conveyor and the rotating tooth past a substantially stationary blade comprises moving the rotating teeth of the rotating wheel member while projected into the evisceration vent of a carcass past a substantially stationary blade.

27. A method of cutting poultry carcasses as a plurality of the carcasses are moved in series in an inverted attitude by an overhead conveyor along a path comprising rotating a wheel member about an axis with its peripheral edge moving in timed relationship with respect to the movement of the carcasses, inserting a rotating tooth of the wheel member into the evisceration vent of each poultry carcass, carrying the poultry carcass with the inserted rotating tooth past a substantially stationary blade element, and cutting the poultry carcass with the blade element between the keel and the thighs toward the backbone.

28. The method according to claim 27 wherein the step of carrying the poultry carcass with the rotating tooth past a blade element comprises moving the poultry carcass past the blade element juxtaposed the wheel member and that projects from adjacent the axis of the wheel member toward the periphery of the wheel member.

29. The method according to claim 28 further including the step of moving each poultry carcass with a flited conveyor in timed relationship with the movement of the carcasses by the overhead conveyor toward the position where the wheel member rotating teeth are inserted into the evisceration vents of the carcasses.

30. The method according to claim 28 further including the step of bending the lower portion of the carcass with respect to the upper portion of the carcass after the carcass has been cut so as to break the backbone of the carcass.

31. A method of cutting poultry carcasses as a plurality of the carcasses are moved in series in an inverted attitude by an overhead conveyor along a path comprising rotating a wheel member about an axis with its peripheral edge moving in timed relationship with respect to the movement of the carcasses, inserting a protrusion of the wheel member into the body cavity of each poultry carcass, carrying the poultry carcass with the protrusion past a substantially stationary knife element, and cutting the poultry carcass with the knife element between the keel and the thigh bones toward the backbone.

32. The method of claim 31 and wherein the step of carrying the poultry carcass with the protrusion past a knife element comprises moving the poultry carcass past a knife element juxtaposed the wheel element and that projects from adjacent the axis of the wheel member toward the periphery of the wheel member.

33. The method of claim 32 and further including the step of moving each poultry carcass with an auger conveyor in timed relationship with the movement of the carcasses by the overhead conveyor toward the position where the wheel member protrusions are inserted into the cavities of the carcasses.

34. The method of claim 32 and further including the step of bending the lower portion of the carcass with respect to the upper portion of the carcass after the carcass has been cut so as to break the backbone of the carcass.

35. Apparatus for cutting poultry carcasses between the keel and the thigh bones toward the backbone as the poultry carcasses are moved along a predetermined path by an overhead conveyor suspended in an inverted attitude, said apparatus comprising a wheel member rotatably supported on an axis approximately normal to the path of the carcasses, said wheel member including a series of protrusions at circumferentially spaced intervals thereabout with the protrusions sized and shaped to project into the cavities of poultry carcasses moving along the predetermined path, and a stationary knife member positioned in the predetermined path of the carcasses in juxtaposition with said wheel member at the protrusions of said wheel member whereby the protrusions carry the poultry carcasses to the knife member and the knife member cuts through the poultry carcasses.

36. The apparatus of claim 35 and further including a conveyor means positioned adjacent the path of the poultry carcasses for urging the lower portion of each carcass that has been partially separated from the upper portion of the carcass along a diverging path so as to bend the lower portion of each carcass with respect to the upper portion of each carcass and break the backbones of the carcasses.

* * * * *